(12) United States Patent
Schmid et al.

(10) Patent No.: US 10,247,147 B2
(45) Date of Patent: Apr. 2, 2019

(54) AIR FILTER DEVICE, PARTICULARLY FOR A MOTOR VEHICLE

(71) Applicant: MANN+HUMMEL GMBH, Ludwigsburg (DE)

(72) Inventors: Daniel Schmid, Sachsenheim (DE); Guenter Goerg, Moeglingen (DE); Timo Dirnberger, Marbach (DE); Ralf Dietz, Remseck (DE); Michael Heim, Freiberg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 24 days.

(21) Appl. No.: 14/490,842

(22) Filed: Sep. 19, 2014

(65) Prior Publication Data

US 2015/0075127 A1 Mar. 19, 2015

(30) Foreign Application Priority Data

Sep. 19, 2013 (DE) .......................... 10 2013 015 496

(51) Int. Cl.
*F02M 35/02* (2006.01)
*F02M 35/024* (2006.01)

(52) U.S. Cl.
CPC .... *F02M 35/02416* (2013.01); *F02M 35/024* (2013.01)

(58) Field of Classification Search
CPC ......... F02M 35/2416; F02M 35/10144; F02M 35/10262; F02M 35/10137; F02M 35/203–35/204; F02M 35/10013; F02M 35/24; B01D 46/05; B01D 46/525; B01D 46/528; B01D 46/2411
USPC ............. 55/385.3, 498, 502, 503; 123/198 E
See application file for complete search history.

(56) References Cited

U.S. PATENT DOCUMENTS

| | | | |
|---|---|---|---|
| 6,117,202 A | 9/2000 | Wetzel | |
| 7,501,004 B2* | 3/2009 | Tschech | B01D 46/0005 123/198 E |
| 7,658,777 B2* | 2/2010 | Kopec | B01D 46/0005 55/385.3 |
| 2011/0099961 A1* | 5/2011 | Amesoeder | B01D 46/525 55/502 |
| 2011/0167776 A1* | 7/2011 | Gorg | B01D 46/0063 55/493 |
| 2014/0090344 A1* | 4/2014 | Wagner | F02M 35/02491 55/502 |
| 2014/0224229 A1* | 8/2014 | Brand | F02B 33/02 123/563 |

FOREIGN PATENT DOCUMENTS

DE 3118413 A1 11/1982

* cited by examiner

*Primary Examiner* — Duane Smith
*Assistant Examiner* — Minh Chau T Pham
(74) *Attorney, Agent, or Firm* — James Hasselbeck

(57) ABSTRACT

An air filter device for a motor vehicle, having a filter element received in a filter housing which, at least in sections, is surrounded by an encompassing frame part. A support bead is held on the filter housing which protrudes over the directly adjacent filter housing wall, wherein a sealing element on the frame is supported by the support bead on the housing.

14 Claims, 5 Drawing Sheets

AIR FILTER DEVICE, PARTICULARLY FOR A MOTOR VEHICLE

CROSS-REFERENCE TO RELATED APPLICATION

This application claims the benefit of German patent application No. 10 2013 015 496.0 filed Sep. 19, 2013, the entire contents of the aforesaid German patent application being incorporated herein by reference.

TECHNICAL FIELD

The invention relates to an air filter device, particularly for a motor vehicle, according to the preamble of claim 1.

BACKGROUND

From DE 10 2011 011 595 A1, an air filter device for a motor vehicle is known, which has a filter element insertable in a filter housing and which is connected to a frame part on its inflow front side. The frame part protrudes over the lateral surface of the filter element in lateral direction and acts as a support on the front-side edge of the filter housing. The frame part is pressed against the filter housing by a placed lid which is to be connected to the filter housing by means of tension clamps. Air is supplied through the lid which is designed as a two-part cyclone separator.

From U.S. Pat. No. 6,117,202, an air filter device for clean rooms is known which has a pleated filter element with a lateral frame part which, in the region of a front side, is designed so as to be U-shaped and to receive a sealing element. A protrusion of a filter housing, into which the filter element is inserted, extends into the U-shaped receiving space with the sealing element arranged in said receiving space.

SUMMARY OF THE INVENTION

The invention addresses the problem of providing a flow-tight and durable connection between an air filter element and a receiving filter housing with simple constructive measures.

The air filter device according to the invention is used, for example, in motor vehicles for filtering the combustion air to be supplied to the internal-combustion engine. A use in trucks as well as passenger cars is conceivable.

The air filter device has a filter housing and a filter element insertable in the filter housing, the filter element being to some extent or entirely surrounded by an encompassing frame part. The frame part is preferably located on a front side of the filter element, particularly on the inflow front side.

On the frame part, a sealing element is arranged with a support bead associated thereto on the filter housing. The sealing element sealingly bears against the support bead on the housing, thus providing a flow-tight connection between the sealing element on the filter element and the support bead on the housing and thus preventing faulty airflows. The support bead protrudes over the directly adjacent sections of the filter housing wall, on which the support bead is arranged, and therefore the support bead presses into the material of the sealing element. This is advantageous because it reduces the risk of shearing the sealing element in case of a relative movement between filter element or frame part and filter housing. Furthermore, this also prevents a part of the sealing element to get caught between the filter housing and the frame part, which could lead to a diminished sealing effect and possible destruction of the sealing element.

According to an advantageous embodiment, the support bead has, at least in the section protruding into the sealing element, a smaller width than the sealing element, and therefore, the support bead, centrally acting on the sealing element, has a lateral distance to the frame part wall sections which encompass the sealing element. Thus, there is only one sealing support between the sealing element and the support bead.

According to a further advantageous embodiment, the sealing element is received in a continuous receiving space on the frame part which is outwardly open. The frame part has two limbs which are spaced apart and laterally delimiting the receiving space and preferably integral with the frame part. On the frame part, the receiving space forms a continuous groove, in which the sealing element, which is preferably designed so as to be one piece and continuous, is inserted. Advantageously, the sealing element, in its unloaded state, does not protrude over the front sides of the laterally delimiting limbs of the receiving space. Together with the protruding support bead, this results, in sealing position, in the support bead to protrude into the sealing material while the front side of the sealing element simultaneously extends, at maximum, to the front sides of the delimiting limbs of the receiving space. As a result, support and sealing is provided along the connecting line of sealing element and support bead as well as in transverse direction hereto by means of the section of the support bead protruding into the sealing element.

The support bead is securely arranged on the wall of the filter housing. A one-piece design with the support bead forming a protruding section on the wall of the filter housing as well as a two-piece design with the support bead designed as separate component, which is still securely connected to the wall of the filter housing, are conceivable.

For example, the support bead has a mushroom shape, wherein the mushroom cap is located on the side facing away from the sealing element, and the mushroom stalk makes contact with the sealing element. Advantageously, the support bead is designed so as to be rounded on the side facing the sealing element, for example, partially circular, thus reducing the risk of cutting into the material of the sealing element. Instead, the rounded front side supports a compressing of the sealing element.

According to a further advantageous embodiment, the support bead is designed so as to be continuous on the filter housing, as well as the sealing element which is arranged on the frame part. As a result, a sealing on all sides between the filter element and the receiving filter housing is achieved.

According to a further expedient embodiment, the continuous frame part forms a receiving space for an air channel which is part of the air flow path through the air filter device. The frame part receives the air channel and connects it with the filter element. The air channel is preferably used to supply raw air to the raw or inflow side of the filter element; however, it is also possible to arrange the air channel on the clean or outflow side of the filter element, thus being designed as clean air channel.

According to a further advantageous embodiment, the frame part, in its mounted state, is at least to some extent arranged on the outer side of the filter housing. This allows for a direct connection of the air channel with the frame part. Furthermore, the external section of the frame part can be used for connecting with the filter housing. Therefore, the frame part has two functions: Connecting the filter element with the filter housing and connecting the air channel with the filter element. An additional fastening device for fastening the air channel to the filter housing is not required.

The frame part can be adhesively bonded to the filter element. For the adhesive bonding, a liquid adhesive is used, which, in its uncured state, is filled into an adhesive receiving space located between the frame part and the filter element. In order to prevent the liquid adhesive from flowing along the outer side of the filter element before it is cured, a sealing lip is advantageously located between the frame part and the filter element which delimits the adhesive receiving space between frame part and filter element. The sealing lip prevents an uncontrolled flow of the liquid adhesive during the bonding process between frame part and filter element. The sealing lip can also remain on the filter element and/or frame part even after completion of the bond and be inserted into the filter housing together with those components.

BRIEF DESCRIPTION OF THE DRAWINGS

Further advantages and expedient embodiments can be found in the further claims, the description of the figures, and the drawings.

Figure 1:
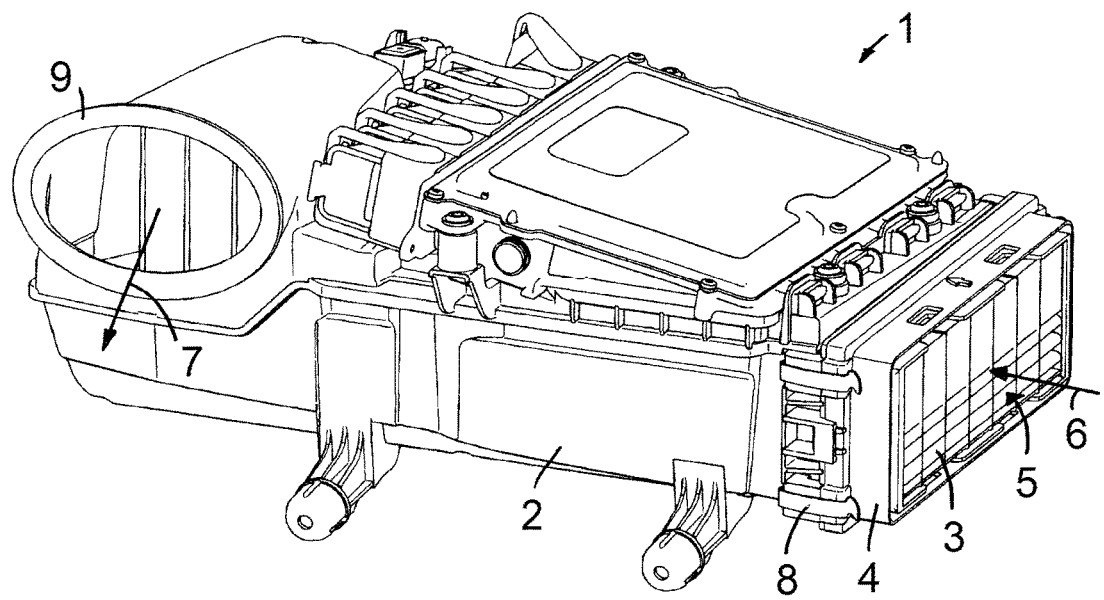
FIG. 1 shows a perspective view of an air filter device for a motor vehicle, having a filter housing and a filter element inserted on the front side, which is surrounded by a continuous frame part, by means of which the filter element is held on the filter housing.

In the drawings, the same components are denoted with the same reference signs.

DETAILED DESCRIPTION

The drawings show an air filter device 1 for a motor vehicle, for example, a truck, which is used for filtering the combustion air to be supplied to the internal-combustion engine. In a filter housing 2, the air filter device 1 has a filter element 3 which is surrounded in the region of its front-side inflow side by a continuous frame part 4. By way of example, the filter element 3 is designed as pleated filter bellow.

The frame part 4 is located directly adjacent to the inflow or raw side 5 of the filter element 3 which, according to arrow 6, is supplied with air to be cleaned. After filtration, the cleaned air exits through the clean or outflow side of the filter element and leaves the filter housing 2 through an outflow nozzle 9 according to arrow 7. The filter element 3 is secured on the filter housing 2 by means of tension clamps 8 which connect the frame part 4 with the filter housing 2. In the mounted state, the frame part 4 overlaps the front edge of the filter housing and extends to the outer lateral surface of the filter housing in the region adjacent to the insert opening for the filter element.

Figure 2:
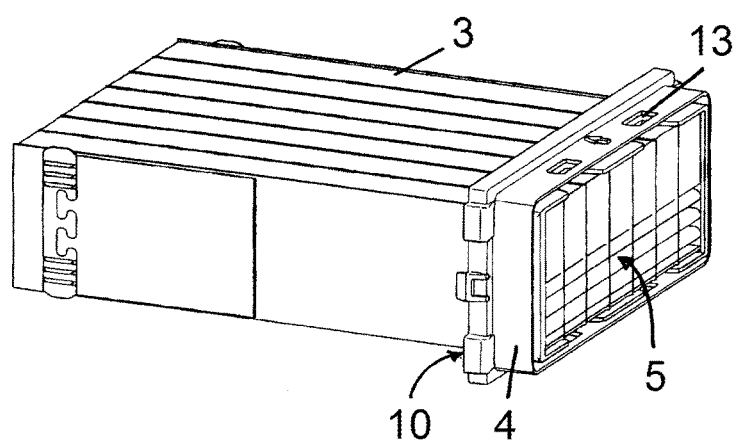
FIG. 2 shows a cube-shaped filter element with front-side frame part.

As can be seen in the individual depiction according to FIG. 2, the filter element 3 is designed so as to be cube-shaped and has a rectangular profile. Correspondingly, the inflow side 5 of the filter element 3 and the frame part 4 are designed so as to be rectangular. The frame part 4 protrudes over the outer sides of the filter element 3, wherein the front side of the frame part forms a support surface on the protruding section on the side facing away from the inflow side 5 which, in the mounted state, rests on the open front side of the filter housing. This support surface on the frame part 4 is denoted with reference sign 10.

Figure 3:
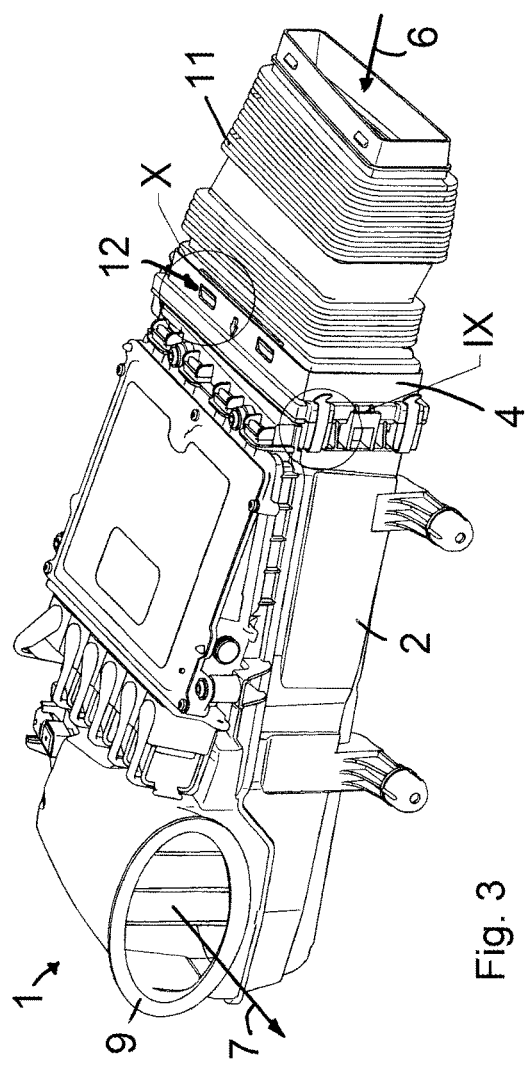
FIG. 3 shows a depiction corresponding to FIG. 1 but with an air channel inserted into the frame part of the filter element.
Figure 4:
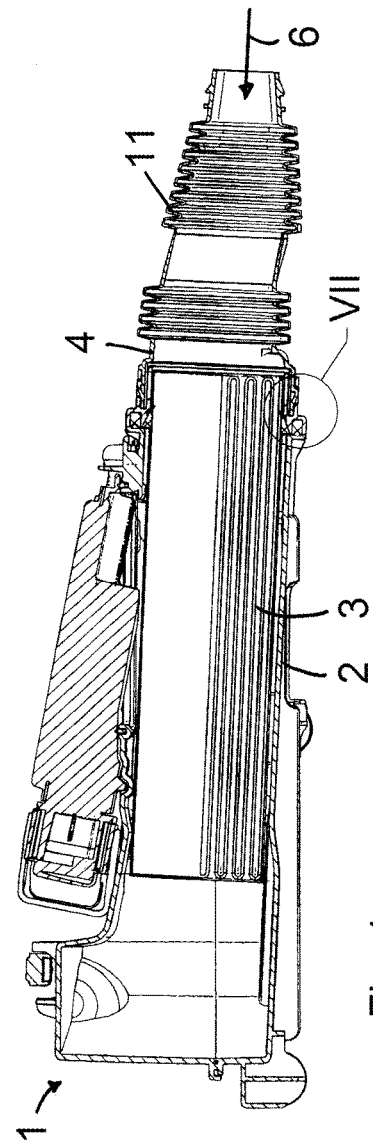
FIG. 4 shows a longitudinal cross-section through the air filter device according to FIG. 3.
Figure 10:
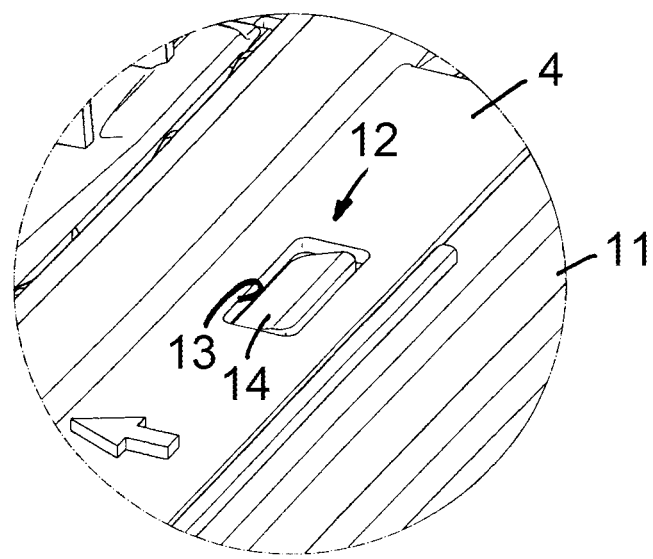
FIG. 10 shows detail X from FIG. 3 with a depiction of the air channel interlockingly connected to the frame part.

In the mounted state, the frame part 4 is located at least substantially outside of the filter housing 2 (FIGS. 1, 3, and 4) and is connected to the filter housing 2 by means of the tension clamps 8. As seen on FIG. 8, in the region of the inflow side of the filter element 3, the frame part 4 includes a first leg 40 and a second leg 42 forming a receiving space or receiving groove 44 for an air channel 11 (FIGS. 3, 4) for supplying raw air to the air filter device 1 according to arrow 6. The air channel 11 is inserted in the receiving space 44 in the frame part 4 and interlockingly connected to the frame part 4 using an interlocking connection 12. The interlocking connection 12, shown in detail in FIG. 10, comprises recesses 13 in the frame part 4 and elastic snap-in noses 14 on the outer side of the air channel 11 facing the front side. The snap-in noses 14 can be pressed elastically inward in radial direction, thereby allowing for the air channel 11 to be inserted until the snap-in noses 14 interlockingly engage in the recesses 13. The interlocking connection 12 can also be released by radially pressing the snap-in noses 14 outward from the recesses 13 in the same manner. The air channel 11 and the frame part 4 are solely connected by means of the interlocking connection 12 and between these two components. However, a connection between the air channel 11 and the filter housing 2 is not provided. The interlocking connection 12 is located directly outside of the front-side opening in the filter housing 2.

Figure 7:
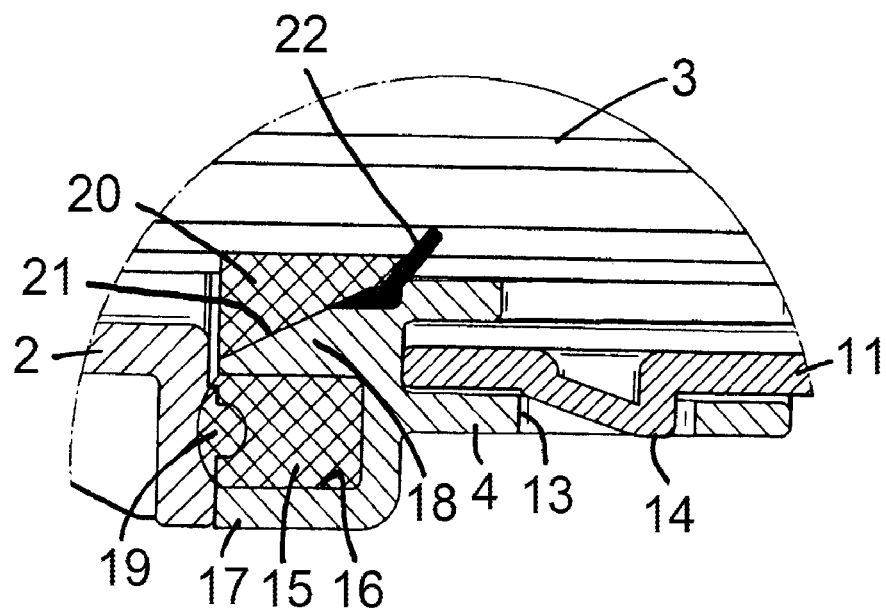
FIG. 7 shows detail VII from FIG. 4 in magnified depiction with a sealing element on the frame part, with a support bead on the housing associated with said frame part, and a sealing lip which delimits an adhesive receiving space between frame part and filter element.
Figure 8:
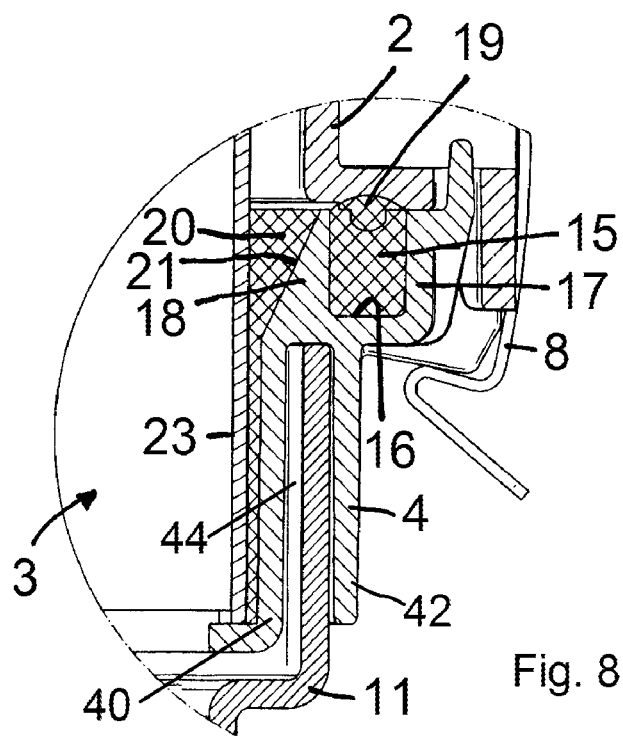
FIG. 8 shows detail VIII from FIG. 6 in magnified depiction with the sealing element on the frame and the support bead on the housing.

FIGS. 7 and 8 show a sealing arrangement between the frame part 4 and the filter housing 2. The sealing arrangement comprises a sealing element 15 which is placed in a continuous receiving space 16 on the frame part 4. The receiving space 16 is formed between the spaced apart first limb 18 and the second limb 17 of the frame part 4. The receiving space 16 is designed so as to be open on the front side facing the filter housing 2 and is delimited by the two limbs 17 and 18 which are spaced apart and designed so as to be integral with the frame part 16.

A support bead 19, which acts together with the sealing element 15, is located on the filter housing 2. The support bead 19 can be designed so as to be integral with the filter housing 2 or a separate component which can be made of a different material than the filter housing but is securely connected to the filter housing 2. The profile of the support bead 19 is mushroom-shaped, wherein a narrower stalk of the support bead 19 is facing the sealing element 15 and is in contact with said sealing element 15. The limb of the support bead 19 has a smaller width than the sealing element 15 and acts centrally on the sealing element 15. This design is sufficiently flow-tight and the risk of shearing in the region of the sealing element 15 is significantly reduced. Advantageously, the sealing element 15 lines up with the front side of the limbs 17, 18, and so no shearing is possible in the region of the front side of the sealing element 15 even in case of a relative movement between the frame part 4 and the filter housing 2.

The support bead 19 protrudes over the directly adjacent walls of the filter housing 2 and presses into the pliable material of the sealing element 15. The front side of the stalk of the support bead 19, which protrudes into the sealing element 15, is designed so as to be rounded.

Figure 5:
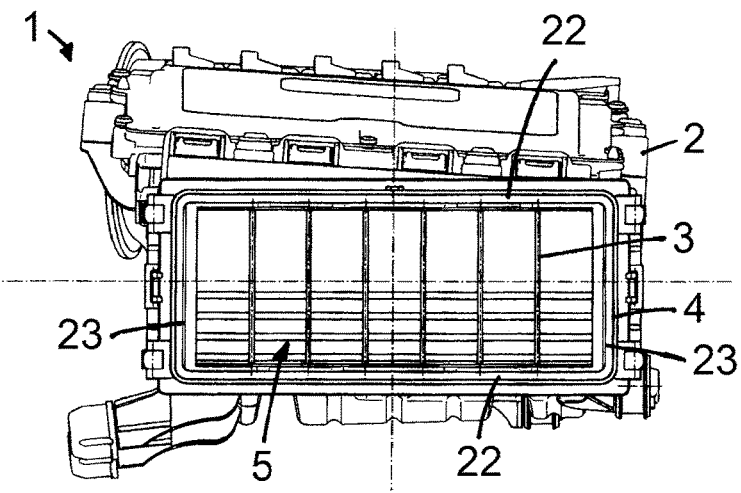
FIG. 5 shows a front-side view of the air filter device in the region of the inflow side of the filter element.
Figure 6:
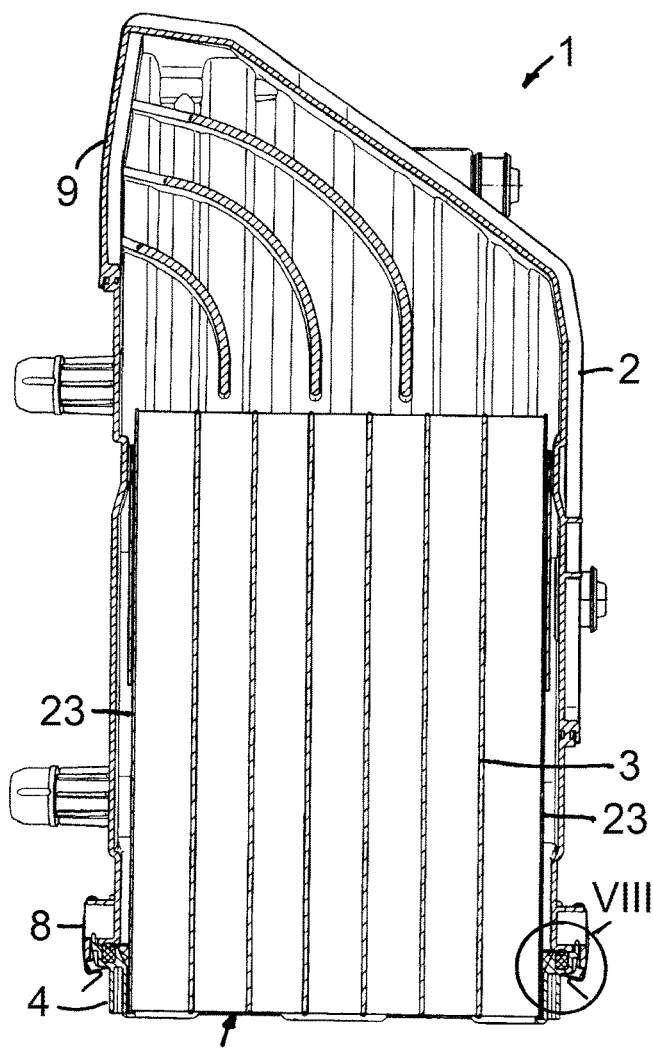
FIG. 6 shows a perpendicular cross-section through the air filter device.

Furthermore, FIGS. 7 and 8 in conjunction with FIGS. 5 and 6 show that the frame part 4 is adhesively bonded with the filter element 3. Adhesive bonding is effected by means of continuously arranged adhesive application 20 which is filled into an adhesive receiving space 21 between the frame part 4 and the filter element 3. The adhesive is filled in its liquid state during the manufacturing process and subsequently cures. In order to prevent the adhesive 20 to flow downward from the adhesive receiving space 21 during the curing process, a sealing lip 22 is arranged on the adhesive receiving space 21 with its approximately triangular profile (FIGS. 5, 7). The sealing lip 22 is securely connected to the frame part 4 and remains arranged on the frame part 4 even in the cured state of the adhesive 20.

The adhesive receiving space 21 is, relative to the receiving space 16 for receiving the sealing element 15, arranged so as to be offset radially inward and, relative to the receiving space 16 for the sealing element 15, separated from the limb 18 which simultaneously laterally delimits the adhesive receiving space 21. The sealing lip 22 is arranged at the foot of the limb 18 and extends obliquely inward, delimiting the tapering side of the adhesive receiving space; the free front side of the sealing lip 22 bears against the outer lateral surface of the filter element 3.

The sealing lip 22 is arranged on the two opposite longitudinal sides of the rectangular frame part 4 (FIG. 5). One side band 23 each is located on the narrow faces of the filter element 3 which is securely connected to the filter element 3 and, in the region of the narrow faces, delimits the adhesive receiving space 21 toward its tapering side (FIGS. 5, 6, and 8).

Figure 9:
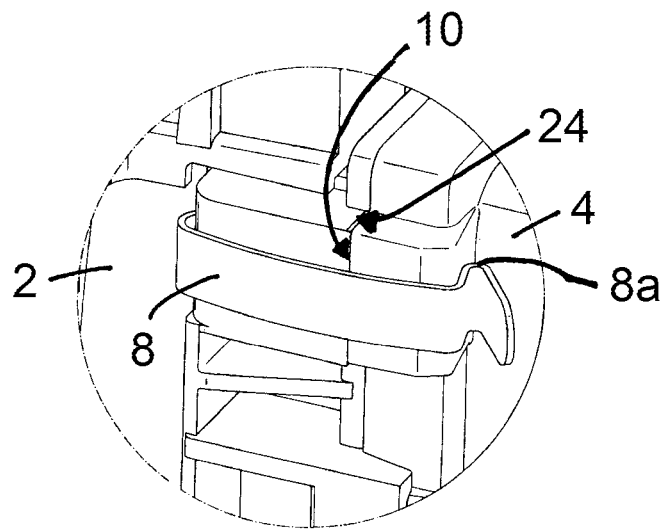
FIG. 9 shows detail IX from FIG. 3 with a tension clamp for securing the frame part on the filter housing.

FIG. 9 shows the support of the frame part 4 on a counter contact surface on the filter housing 2 and the connection by means of the tension clamp 8. The part of the frame part 4 which radially protrudes over the filter element has the support surface 10 (see also FIG. 2) which is facing away from the inflow side and in the connected state bears against the counter contact surface 24 on the filter housing. The tension clamp 8 is held pivotably movable on the outer surface of the filter housing 2, and, in the tensioned state, overlaps the section on the housing with the counter contact surface 24 and the section of the frame part 4 with the support surface 10. The tension clamp 8 is designed so as to be elastic; in the tensioned state, a tension section 8a overlaps the recess on the frame part 4, on which the support surface 10 is arranged and thus presses the frame part 4 with the support surface 10 against the counter contact surface 24 on the filter housing 2.

We claim:

1. An air filter device for a motor vehicle, comprising:
   a filter housing including:
      a circumferential housing wall surrounding an opening into the housing, the circumferential housing wall forming a radially outwardly projecting flange;
      a support bead secured onto the flange and circumferentially surrounding the opening, the support bead having:
         a head portion secured onto the flange; and
         a stalk portion that protrudes outwardly from the head and flange, the stalk having a narrow width relative to the flange;
   a filter element of a filter medium, the filter element received into the opening of the filter housing, the filter element including:
      an inflow face at a first axial end of the filter element, for raw air to enter the filter element;
      an outflow face an opposing axial end of the filter element, for filtered air to exit the filter element;
      wherein axial, is used herein, is a direction from the inflow face to the outflow face;
      wherein radial, as used herein, is a direction traverse to the axial direction;
   a frame part circumferentially surrounding the filter element, the frame part fixedly secured onto the filter medium, the frame part including:
      a sealing arrangement arranged on first axial side of the frame part, having:
         a first limb projecting axially outwardly from the first axial side of the frame part and continuously circumferentially closing about the filter medium;
         a second limb projecting axially outwardly from the first axial side of the frame part, and spaced radially outwardly away from the first limb and continuously circumferentially closing about the first limb;
         a continuous U-shaped recess arranged on the first axial side of the frame part, the U-shaped recess arranged between, formed and delimited by the first and second limbs, forming a continuous circumferential seal receiving space surrounding the filter medium; and
         a continuous circumferentially closed sealing element of a pliable elastic material arranged in the U-shaped recess of the circumferential seal receiving space, contacting and bearing against the filter housing; and
      a holding interface arranged on an opposite second axial side of the frame part, opposite the sealing arrangement, having:
         a first leg projecting axially outwardly from the second axial side of the frame part, projecting axially outwardly away from the continuous U-shaped recess, the first leg continuously circumferentially surrounding the filter medium;
         a second leg projecting axially outwardly from the second axial side of the frame part, projecting axially outwardly away from the continuous U-shaped recess, the second leg spaced radially outwardly from the first leg and continuously circumferentially surrounding the first leg; and
         a circumferential receiving groove having a U-shaped cross section, the circumferential receiving groove opening axially outwardly at the first axial end of the filter element, the circumferential receiving groove configured to receive and engage with an air channel component;
      wherein the stalk of the support bead the filter housing protrudes into the U-shaped recess of the sealing arrangement, pressing into the elastic material of the sealing element, compressing the sealing element in the U-shaped recess.

2. The air filter device according to claim 1, wherein the support bead on the housing has a mushroom-shaped profile.

3. The air filter device according to claim 1, wherein a front side of the support bead on the housing is rounded on the a side facing the sealing element on the frame part.

4. The air filter device according to claim 1, wherein a section of the support bead facing the sealing element on the frame has a smaller width than the sealing element on the frame part.

5. The air filter device according to claim 1, wherein the support bead is integral with the circumferential housing wall of the filter housing.

6. The air filter device according to claim 1, wherein the support bead is continuous on the filter housing.

7. The air filter device according to claim 1, wherein the sealing element, in its unloaded state, does not protrude over the front sides of the first and second limbs of the receiving space.

8. The air filter device according to claim 1, wherein the frame part forms a receiving space for an air channel on the filter element;
wherein the frame part is arranged on the outer side of the filter housing.

9. The air filter device according to claim 1, wherein an air channel is insertable in the frame part;
the frame part is held onto the filter housing by means of its outer side.

10. The air filter device according to claim 1, wherein the frame part is adhesively bonded onto the filter element; and
wherein a sealing lip is arranged radially between the frame part and the filter element which delimits an adhesive receiving space between frame part and filter element.

11. The air filter device according to claim 1, wherein the second leg includes at least one recess extending through the second leg, the at least one recess forming an interlocking connection operable to engage with and interlock to the air channel component engaged into the circumferential receiving groove.

12. An air filter element for a filter device, comprising:
a filter medium;
an inflow face at a first axial end of the filter element, for raw air to enter the filter element;
an outflow face an opposing axial end of the filter element, for filtered air to exit the filter element;
wherein axial, is used herein, is a direction from the inflow face to the outflow face;
wherein radial, as used herein, is a direction traverse to the axial direction;
a frame part circumferentially surrounding the filter element, the frame part fixedly secured onto the filter medium, the frame part including:
a sealing arrangement arranged on first axial side of the frame part, having:
a first limb projecting axially outwardly from the first axial side of the frame part and continuously circumferentially closing about the filter medium;
a second limb projecting axially outwardly from the first axial side of the frame part, and spaced radially outwardly away from the first limb and continuously circumferentially closing about the first limb;
a continuous U-shaped recess arranged on the first axial side of the frame part, the U-shaped recess arranged between and delimited by the first and limbs, forming a circumferential seal receiving space surrounding the filter medium; and
a continuous circumferentially closed sealing element of a pliable elastic material arranged in the U-shaped recess of the circumferential seal receiving space; and
a holding interface arranged on an opposite second axial side of the frame part, opposite the sealing arrangement, having:
a first leg projecting axially outwardly from the second axial side of the frame part, projecting axially outwardly away from the continuous U-shaped recess, the first leg continuously circumferentially surrounding the filter medium;
a second leg projecting axially outwardly from the second axial side of the frame part, projecting axially outwardly away from the continuous U-shaped recess, the second leg spaced radially outwardly from the first leg and continuously circumferentially surrounding the first leg; and
a circumferential receiving groove having a U-shaped cross section, the circumferential receiving groove opening axially outwardly at the first axial end of the filter element, the circumferential receiving groove configured to receive and engage with an air channel component.

13. The air filter element according to claim 12, wherein the second leg of the holding interface includes at least one recess extending through the second leg, the at least one recess forming an interlocking connection operable to engage with and interlock to the air channel component receivable into the circumferential receiving groove.

14. The air filter element according to claim 12, further comprising:
an adhesive receiving space formed between the first axially extending limb and a circumferential outer wall of the filter medium, the adhesive receiving space having a triangular profile;
a sealing lip is arranged on the first axially extending limb at a narrow end of the triangular profile of the adhesive receiving space, the sealing lip closing the adhesive receiving space between the circumferential outer wall of the filter medium, closing the narrow end of the triangular profile of the adhesive receiving space.

* * * * *